United States Patent
Sehgal

[11] Patent Number: 5,912,887
[45] Date of Patent: Jun. 15, 1999

[54] SYSTEM AND METHOD FOR IMPLEMENTING USER-TO-USER DATA TRANSFER SERVICES

[75] Inventor: Shailin Sehgal, Allen, Tex.

[73] Assignee: MCIWorldCom, Inc., Ga.

[21] Appl. No.: 08/673,221

[22] Filed: Jun. 27, 1996

[51] Int. Cl.⁶ ............................. H04J 3/02; H04M 11/00
[52] U.S. Cl. .................... 370/354; 370/524; 379/230
[58] Field of Search ................... 370/354, 356, 370/360, 410, 465, 522, 524; 379/93.01, 93.14, 93.15, 230

[56] References Cited

U.S. PATENT DOCUMENTS

| | | | |
|---|---|---|---|
| 4,884,269 | 11/1989 | Duncanson et al. | 370/524 |
| 5,473,679 | 12/1995 | La Porta et al. | 379/201 |
| 5,629,974 | 5/1997 | Rajala et al. | 455/466 |
| 5,712,903 | 1/1998 | Bartholomew et al. | 379/89 |

OTHER PUBLICATIONS

ROLM Functional Specification, "CorNet–VN Interworking Specification," Issue: 1.1/Date: Jul. 26, 1994, pp. 174–181..

*Primary Examiner*—Min Jung

[57] ABSTRACT

A system and method for implementing user-to-user data transfer services utilizes an overlay network to transfer user-to-user data between users independent of communications between the users on a conventional signaling network. The system and method examines a frame of data received from a user to determine whether the frame contains user-to-user data. If the frame does contain user-to-user data, the user-to-user data is removed from the frame and formatted for transfer. The formatted user-to-user data is then transferred to the recipient via the overlay network, independently of the communication between the users on the signaling network.

24 Claims, 5 Drawing Sheets

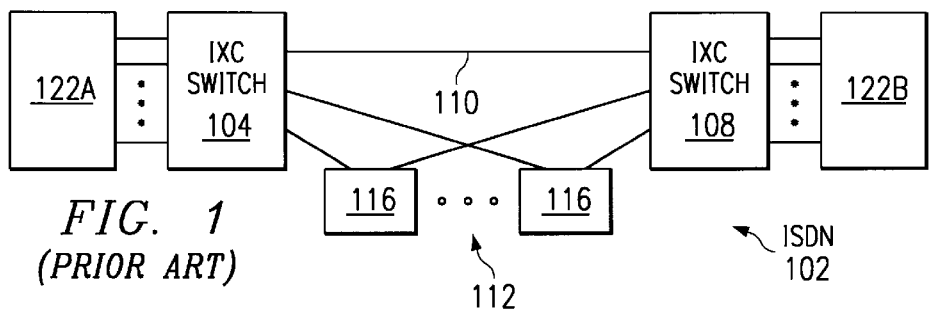
FIG. 1 (PRIOR ART)
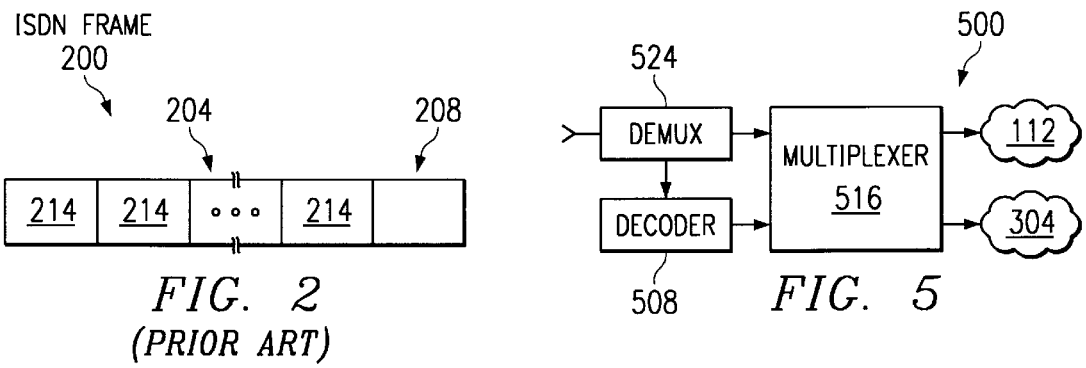
FIG. 2 (PRIOR ART)
FIG. 5
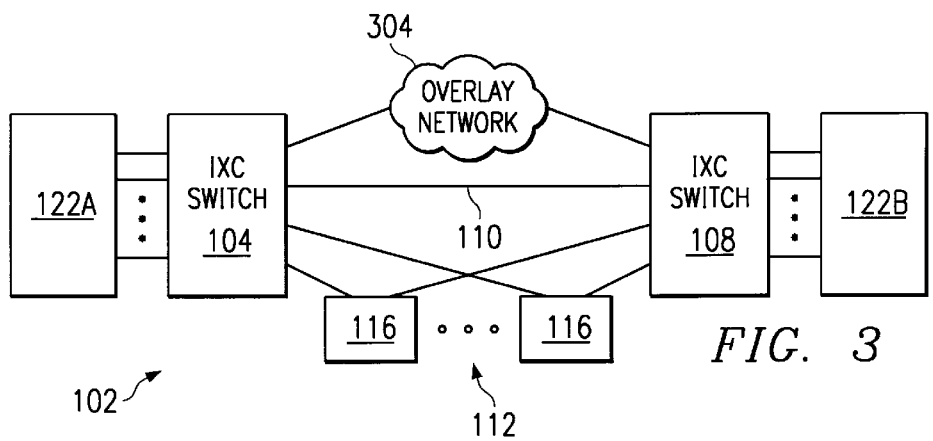
FIG. 3
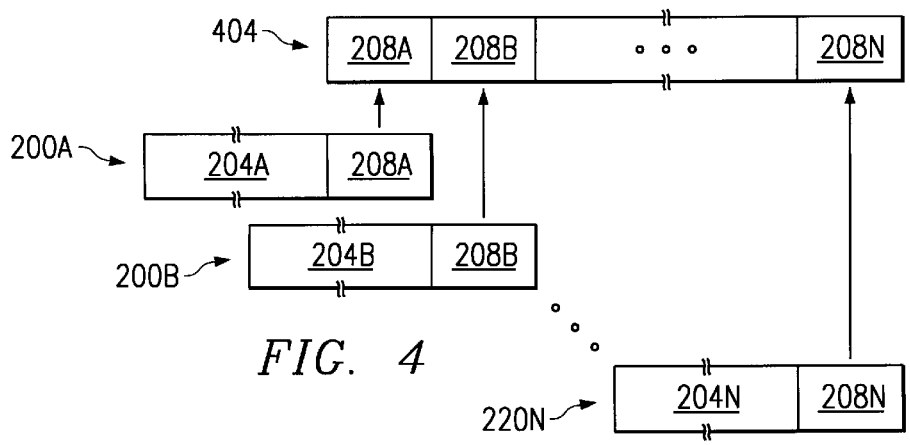
FIG. 4

SYSTEM AND METHOD FOR IMPLEMENTING USER-TO-USER DATA TRANSFER SERVICES

BACKGROUND OF THE INVENTION

1. Field of the Invention

This invention relates generally to communication networks, and more specifically to a system and method for transferring information among users communicating over a communication network.

2. Related Art

Prior to the introduction of the Integrated Services Digital Network, or ISDN, the traditional telephone system required one signaling channel for each voice channel. Thus, to support 23 conversations, the traditional non-ISDN telephone system required 23 voice channels and 23 signaling channels for a total of 46 channels. In contrast, ISDN requires 24 channels total to support 23 conversations. Traditional telephone systems having one signaling channel for each voice channel are said to use in-band signaling. ISDN systems having a single signaling channel for multiple conversation channels are said to use out-of-band signaling.

The ISDN has two transmission components: primary rate interface (PRI) and basic rate interface (BRI). Primary rate interface typically carries twenty-three bearer channels and one signaling channel. In other words, the primary rate interface can support twenty-three simultaneous conversations using a single signaling channel. Basic rate interface carries two bearer channels and a data channel.

User-to-user signaling service exists for users who subscribe to the primary rate interface. With the primary rate interface, twenty-three voice channels can be voiced by a single signaling channel. With user-to-user service the twenty three calls can independently send data between the users using just one signaling channel.

The ISDN signaling channel is directed by an originating inter-exchange carrier switch to a first signal transfer point. The signaling channel is then transferred via a signaling network such as the SS7 signaling network to a second signal transfer point. The signaling channel information is then transferred to terminating inter-exchange carrier switch.

Unfortunately, when a user wishes to send a large block of user data, the signal transfer points can become overloaded as a result of the excessive data flow through the signaling network.

SUMMARY OF THE INVENTION

The present invention is directed toward a system and method for allowing users of a communication network to exchange data via a path that is independent of the communication network's signaling network. According to the invention, an overlay network is provided substantially in parallel with the signaling network. When a user wishes to transfer data to another user, that data (referred to in this document as user-to-user data) is transferred via the overlay network. As a result, this user-to-user data can be transferred concurrently with the network communication (e.g., concurrently with the phone call).

During a typical communication across the network, the users communicate by transferring frames of data across the signaling network. These frames are, for example, ISDN frames or other groupings of data, and can include data such as voice data, modem data or other communication-related data in a voice portion of the block. In addition to this voice portion, one or more of these blocks of data can include a second portion referred to as a signaling portion. It is this signaling portion which contains the user-to-user data.

The invention examines the signaling portion of the frame of data to determine whether it contains user-to-user data to be transferred from a first user to one or more other users. If there is user-to-user data to be transferred, this data is removed (copied or extracted) from the frame and optionally formatted. One type of formatting performed is packetizing the user-to-user data from one or more frames into one or more packets of user-to-user data. The user-to-user data is then transferred to the recipient via the overlay network. This transfer is independent of the communication which occurs over the signaling network (i.e., the transfer of the signaling portion).

An advantage of the invention is that users can simultaneously transfer user-to-user data while conducting a typical network communication such as a phone call. For example, the users may be carrying on a conventional phone conversation and decide that they would like to transfer additional data (for example a computer file) between them. According to the invention, the additional data (user-to-user data) is included in the signaling portion of the frame. The invention detects the user-to-user data, builds a separate block (for example, a packet) of user-to-user data and sends this block via the overlay network to the other user.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1 is a diagram illustrating a conventional ISDN signaling network.

FIG. 2 is a diagram illustrating a conventional ISDN frame of data.

FIG. 3 is a diagram illustrating an overlay network implemented in conjunction with an ISDN signaling network according to one embodiment of the invention.

FIG. 4 is a diagram illustrating formatting of user-to-user data into a block of data according to a packet embodiment of the invention.

FIG. 5 is a diagram illustrating an example architecture for formatting user-to-user data according to one embodiment of the invention.

DETAILED DESCRIPTION OF THE EMBODIMENTS

Figure 6:
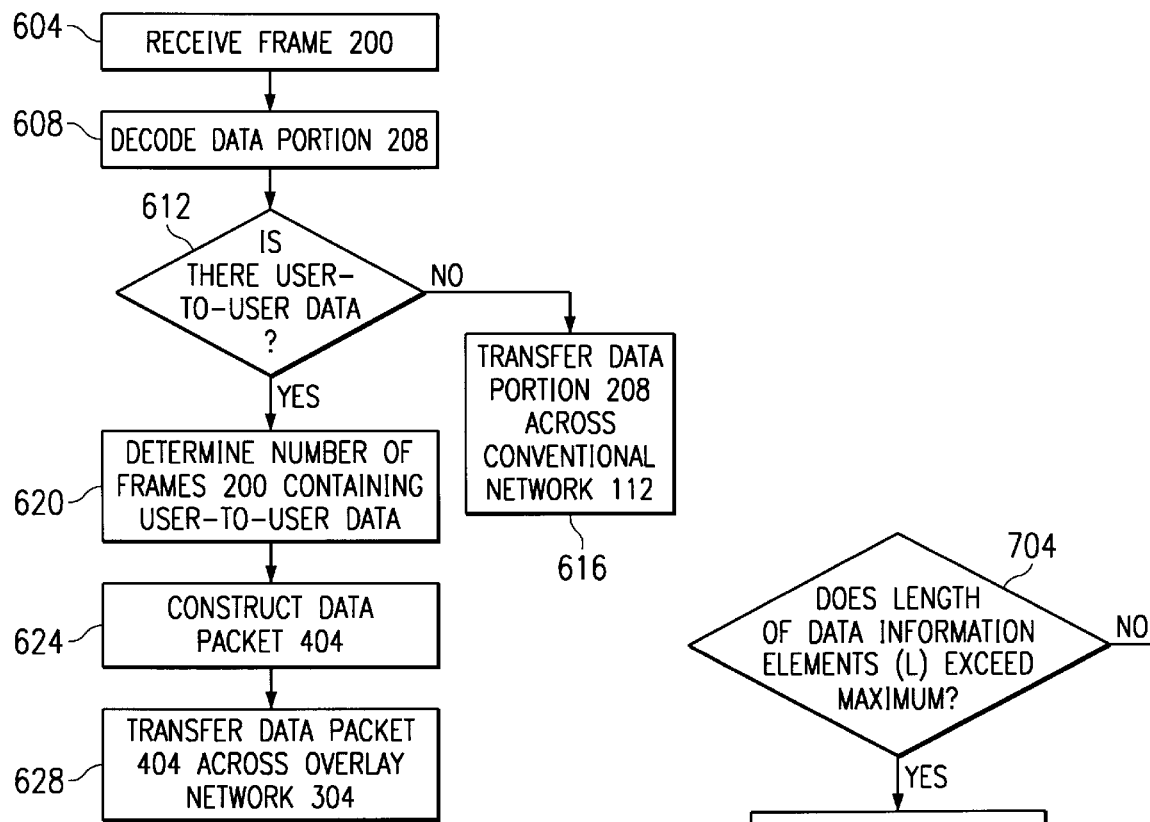
FIG. 6 is an operational flow diagram illustrating a process for transferring user-to-user data across an overlay network according to one embodiment of the invention.

1. Overview and Discussion of the Invention

The present invention is directed toward a system and method for handling the transfer of data between two users in a communication network, such as an ISDN network. More specifically, the invention is particularly well suited to transferring large amounts of data between the two users who are carrying on a communication, such as a voice communication, over the communication network.

According to the invention, an overlay network is provided between an originating switch and a terminating switch of the communication network. The overlay network is a path which is effectively in parallel with a signaling network between the originating switch and the terminating switch. The overlay network provides the communication backbone to allow the data to be transferred between the users while the users are communicating using the communication network. The manner in which the overlay network is implemented and utilized is described in detail below according to several embodiments of the invention.

The invention is particularly useful for a situation where, for example, two or more users are communicating via telephone and would like to simultaneously share or transfer data (such as computer files, images, or other data) among them.

2. Conventional ISDN Signaling

Before describing the invention in detail, it is useful to describe an example environment in which the invention can be implemented. In the broadest sense, the invention can be implemented in any communication network. An example of one such communication network is the ISDN, or Integrated Services Digital Network.

FIG. 1 is a block diagram illustrating an example portion of a conventional ISDN network integrating two example users. ISDN network 102 includes an originating inter-exchange carrier switch 104, a terminating inter-exchange carrier switch 108, and a network 112 comprised of signaling transfer points 116. ISDN network 102 connects ISDN users having customer premise equipment 122 which is ISDN compatible. In FIG. 1, two users (or customers) are contemplated, an originating user having originating customer premise equipment 122A and a terminating user having terminating customer premise equipment 122B.

FIG. 2 is a diagram illustrating an example of a conventional ISDN frame 200. Frame 200 is comprised of a voice portion and a signaling portion. Voice portion 204 is comprised of twenty-three 8-bit channels called bearer channels 214. Signaling portion 208 is comprised of one 8-bit data channel called the signaling channel.

In operation, originating customer premise equipment 122A commmunicates an ISDN sequence of frames 200 to originating inter-exchange carrier switch 104. The signaling channel of the ISDN sequence is transmited by originating inter-exchange carrier switch 104 over the signaling network 112 to terminating inter-exchange carrier switch 108. This transfer is via one or more signaling transfer points 116 which are a part of signaling network 112. Terminating inter-exchange carrier switch 108 communicates the ISDN sequence to terminating customer premise equipment 122B.

With ISDN, the voice channels are transmitted over voice channel paths called Inter Machine Trunks, or IMTs 110. The transmission occurs directly from originating inter-exchange carrier switch 104 to terminating inter-exchange carrier switch 108 via one or more tandem switches in the telephone network.

The signaling channel of the ISDN frame 200 is directed by originating inter-exchange carrier switch 104 to a first signal transfer point 116. The signaling channel is then transferred via a signaling network such as the SS7 signaling network to a second signal transfer point 116. The signaling channel information is then transferred to terminating inter-exchange carrier switch 108. The reason the signaling channel is routed in this manner is to enable an initial arrangement of available switches in the communication network to transport the voice channels.

Unfortunately, when a user wishes to send a large block of user data via signaling portion 208 signal transfer points 116 become overloaded as a result of the excessive data flow through the signaling network. For example, in one scenario, users would like use the signaling channel to send multiple numbers of packets of up to 251 bytes long from originating customer premise equipment 122A to terminating customer premise equipment 122B. The present invention provides a system and method for allowing the users to transfer this data without the overload problems found in conventional signaling networks.

The present invention is described in terms of this example environment of an ISDN communication network. Description in these terms is provided for convenience only. It is not intended that the invention be limited to application in this example environment. In fact, after reading the following description, it will become apparent to a person skilled in the relevant art how to implement the invention in alternative environments.

3. The Overlay Network

As stated above, an overlay network is provided between originating inter-exchange carrier switch 104 and terminating inter-exchange carrier switch 108. The overlay network is a path which is effectively in parallel with the signaling network between the originating inter-exchange carrier switch 104 and terminating inter-exchange carrier switch 108.

FIG. 3 is a diagram illustrating an ISDN network 102 which includes an overlay network 304 according to one embodiment of the invention. According to the invention, consecutive one byte data units in the ISDN signaling channel are mapped into a new protocol for transfer across overlay network 304. Specifically, according to one embodiment of the invention, overlay network 304 is an X.25 network and signaling channel data are mapped into X.25 data packets, although any of several protocols could be used, packet or otherwise. For example, according to one alternative embodiment, the data units are mapped into ATM payloads.

FIG. 4 is a diagram illustrating a packet, or other block of data, used to transfer user-to-user data across overlay network 304 according to one embodiment of the invention. In the embodiment illustrated in FIG. 4, packet 404 is N bytes long. In one embodiment, N is equal to 251, but could be any number depending on network parameters and projected length of the data, file or other user data to be transferred in this manner as user-to-user data.

According to the embodiment illustrated in FIG. 4, the signaling portion 208A, 208B, . . . 208N of N frames 200A, 200B, . . . 200N is removed from its frame 200 and inserted into user-to-user data packet 404. In a preferred embodiment, signaling portion 208 is removed from consecutive frames 200 and concatenated in order to form packet 404. When complete, packet 404 is sent from originating inter-exchange carrier switch 104 to terminating inter-exchange carrier switch 108 via overlay network 304.

FIG. 5 is a block diagram illustrating an example architecture for implementing a user-to-user interface system 500 for assembling a data packet 404 for transfer across overlay network 304 according to one embodiment of the invention. Referring now to FIG. 5, this example architecture for user-to-user interface system 500 includes a data decoder 508 and a datapath multiplexer 516.

When a signaling portion 208 of an ISDN frame 200 is received at user-to-user interface system 500, it is decoded by decoder 508 to determine whether user-to-user information to be transmitted to another user is contained in this and subsequent frames 200. If so, decoder 508 triggers the multiplexer 516 to concatenate that signaling portion 208, with the signaling portions 208 of each subsequent frame 200 containing user-to-user data to create packet 404, and to send packet 404 across overlay network 304 to the terminating user. It should be noted that the architecture illustrated in FIG. 5 is provided by way of example only and that, after reading this description, it will become apparent to one skilled in the relevant art how to implement the functionality of the invention using alternative architectures.

FIG. 6 is an operational flow diagram illustrating a process by which user-to-user data from a frame of data is multiplexed into a block and sent across overlay network 304. In the specific embodiment described with reference to FIG. 6, the frame of data is an ISDN frame 200 and signaling portions 208 of relevant frames 200 are multiplexed into packet 408 and sent across overlay network 304 to the terminating user.

FIG. 6 describes this process in terms of the example architecture presented in FIG. 5. In the embodiment described in FIG. 6, user-to-user interface system 500 is located within or otherwise collocated with originating inter-exchange carrier switch 104.

To enable initiation of user-to-user data transfers in both directions, in one embodiment the user-to-user interface system 500 is also located within or otherwise colocated with terminating inter-exchange carrier switch 108.

Referring now to FIG. 6, in a step 604, a frame 200 is recieved at originating inter-exchange carrier switch 104. More specifically, the signaling portion of frame 200 is recieved by user-to-user interface system 500. User-to-user interface system 500 can also include a demultiplexer 524 to separate signaling portion 208 from voice portion 204 prior to decoding. In the embodiment illustrated in FIG. 5, the demultiplexing is performed when user-to-user interface system 500 receives signaling portion 208.

In a step 608, decoder 508 determines whether the received signaling portion 208 contains user-to-user data to be transferred. If there is no user-to-user data to be transferred among users, multiplexer 516 simply transfers signaling portion 208 across the signaling network (e.g., across the signaling network 112) for conventional out-of-band signaling. This is illustrated by decision step 612 and step 616.

If, on the other hand, decoder determines that received signaling portion 208 contains user-to-user data to be transferred, decoder then determines how many frames 200 contain user-to-user data to be transferred. This is illustrated by decision step 612 and step 620.

In a step 624, decoder 508 configures multiplexer 516 to begin constructing a packet 404 of user-to-user data. For each signaling portion 208 received containing user-to-user data, multiplexer 516 multiplexes the received signaling portion 208 into the packet 404.

In a step 628 when the packet 404 is full, or when there is no further user-to-user data to be transferred, user-to-user interface system 500 transfers packet 404 to the recipient via overlay network 304. More specifically, according to one embodiment, user-to-user interface system 500 transfers packet 404 to terminating inter-exchange carrier switch 108 for subsequent transfer to the terminating user (i.e., the recipient).

In one embodiment, multiplexer has the ability to format packet 404 according to a desired protocol for transmission across overlay network 304. For example, in one embodiment, multiplexer is capable of formatting the data to be transferred in accordance with a file transfer protocol such as FTP (File Transfer Protocol).

According to the specific embodiment just described, the frame of data with which the user-to-user data is an ISDN frame 200 and the block into which the user-to-user data is packed is a packet. Alternative embodiments use alternative data grouping and/or packaging techniques to achieve a similar result.

4. User-to-User Services

According to the invention, overlay network 304 is implemented to support user-to-user data transfer, as described above. Now described are some example types of user-to-user data transfer services contemplated in accordance with the invention. Note that the example embodiments described in this section are described in terms of specific messages being transferred among the various elements of network 112 and overlay network 304. After reading this description, it will become apparent to a person skilled in the relevant art how to implement the invention using alternative messaging or notification techniques.

4.1 Message-Associated User-to-User Service

In one embodiment, the user-to-user service is implemented as a message associated user-to-user service. In one embodiment, the messaging service is similar to the UUS type 1 service as defined by ANSI T1.621-1922. In one embodiment, this service can only be requested by the calling party. According to the invention, when information is exchanged according to the message associated user-to-user service, user information is exchanged within SETUP, ALERTing, CONNect and/or DISConnect call control messages. In one embodiment, up to 128 octets of user information can be transferred in each message.

In one embodiment, message associated user-to-user information is supported in association with a circuit-switched connection. User information may be placed by the originating user in SETUP, ALERTing, CONNect and/or DISConnect call control messages. Message associated user-to-user information can also be included in the first expected clearing message which such as a RELease or RELease COMplete message.

In a scenario where both users disconnect simultaneously, or nearly simultaneously, delivery of message associated user-to-user information in a clearing message is not guaranteed. According to one embodiment of the invention, overlay network 304 will not pass message associated user-to-user information in a DISConnect message when it is sent prior to the call being in the active state.

In addition to the user-to-user information element, overlay network 304 may handle additional data elements as user data information as well. Examples of these additional data elements can include, without limitation, called party subaddress, calling party subaddress, high layer compatibility, low layer compatibility, redirecting number, locking shift to codeset 6 and codeset 6 information elements, and locking shift to codeset 7 and codeset 7 information elements.

In the embodiment where message associated user-to-user information transfer is supported in association with a circuit-switched connection, the support of message associated user-to-user information depends on the availability of resources in the SS7 network. Thus, if, for example, the originating user desires a message associated user-to-user information to be transferred in the SETUP, ALERTing, and/or DISConnect messages, but has no message associated user-to-user information to send in the SETUP message, the originating user places a user-to-user information element in the SETUP message with a length=1.

Although the service can be implemented in a scalable fashion to handle different data rates and volumes, in one embodiment the total length of the information elements satisfies the following criteria:

TABLE 1

| length of the user-to-user information element | from three to 131 octets |
| --- | --- |
| the total length of all user data information elements | shall not exceed 129 octets; |
| combined length of the user-to-user information element and the user data information element | shall not exceed 198 octets. |

Where the size of the information elements is limited, in one embodiment an element with an invalid length will be dropped and status information provided to one or both users. Note that in one embodiment, the invention does not perform verification of receipt of individual user data information elements.

Figure 7:
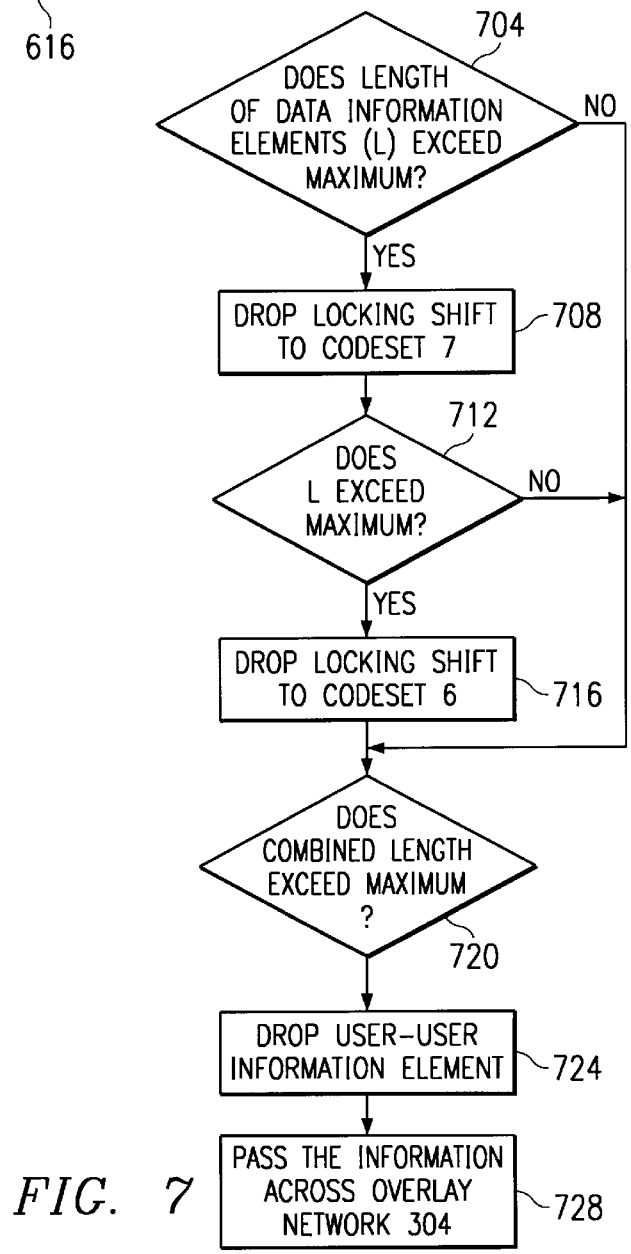
FIG. 7 is an operational flow diagram illustrating a process for determining whether a length of data information elements exceeds a maximum length constraint.

FIG. 7 is an operational flow diagram illustrating one example of a process for determining whether any information elements need to be dropped. This process is described by way of example only. After reading this description, it will become apparent to one of ordinary skill in the art how to implement the invention using other techniques for limiting or otherwise controlling the amount of data transferred, should such a feature be desired.

Referring now to FIG. 7, in a step 704 it is first determined whether the length of the user data information elements except for user-to-user information elements exceeds the maximum number of octants. If the length of all the user data information elements not including the length of the user-to-user information elements does exceed this maximum, the locking shift is dropped to code set 7 and the code set 7 information element. This is illustrated by a step 708.

In a step 712 the system again determines whether the length of all of the user data information elements not including the length of the user-to-user information elements exceeds the maximum number as illustrated by step 712. If this length does exceed the maximum, the locking shift is dropped to code set 6 and the code set 6 information element as illustrated by step 716.

Where the length of all the user data information elements not including the length of the user-to-user information elements does not exceed the maximum number of octants as illustrated in steps 704 and 712, or after the locking shift has been dropped to code set 6 as indicated by step 716, it is determined whether the length of all of the user data information elements plus the length of the user-to-user information elements exceeds the maximum combined length. This is illustrated by a step 720.

If the maximum combined length is exceeded, the user-to-user information elements are dropped in a step 724 and the user data information elements are passed across overlay network 304 in step 728. If, on the other hand, the combined length does not exceed the combined maximum in step 720, the user data information elements along with the user-to-user information elements are passed across overlay network 304 as indicated by a flowline 762 and step 728.

4.2 Call Associated Temporary Signaling Connection

Call associated temporary signaling connections can be requested during or after the call setup request. According to one embodiment, the temporary signaling connection request is handled differently depending on whether it occurs before or after the call setup is complete. If a temporary signaling connection request occurs during call setup, the request is included in the SETUP message. If, on the other hand, the temporary signaling connection request occurs after the call setup is complete, the temporary signaling connection request is made using the FACility message. In both scenarios, according to one embodiment, a binary facility coding value field of a network-specific facilities information element is coded to request a temporary signaling connection.

According to one embodiment, the manner in which temporary signaling connection requests are handled depends on whether setup is complete and on whether the originating or terminating party made the temporary signaling connection request.

4.2.1 Call Associated Temporary signaling connection requested at Call Setup

Figure 8:
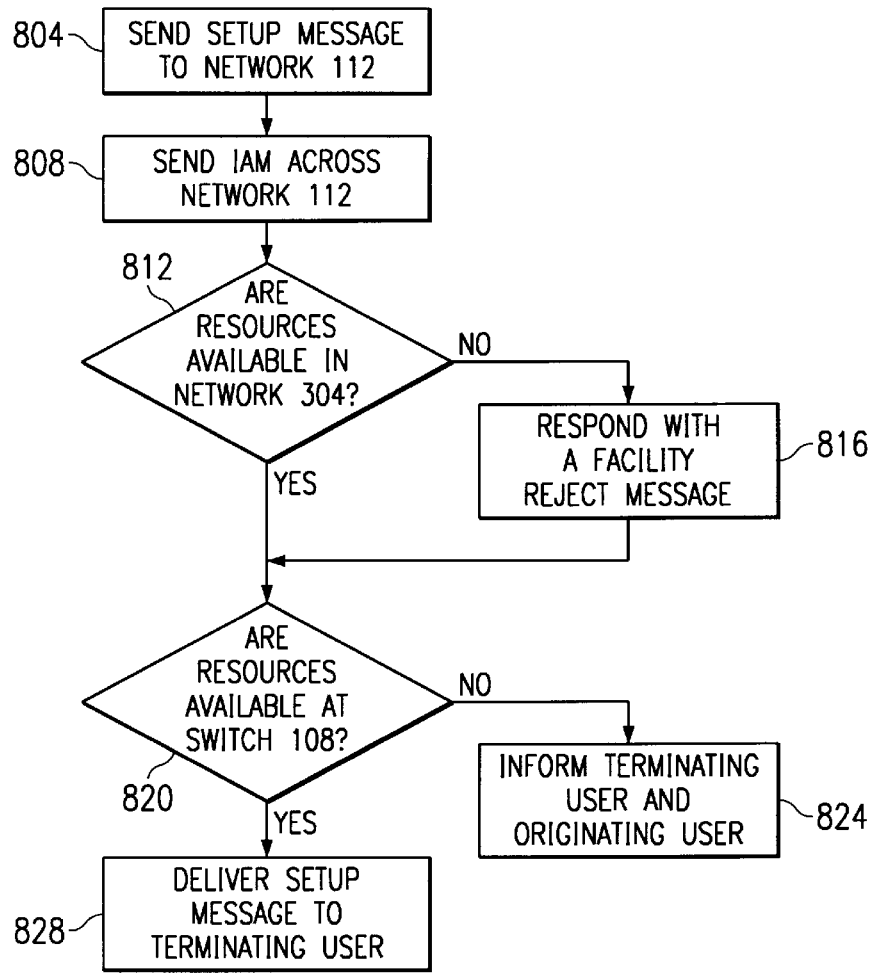
FIG. 8 is an operational flow diagram illustrating a process for handling a temporary signaling connection request when the request is made at setup time according to one embodiment of the invention.
Figure 9:
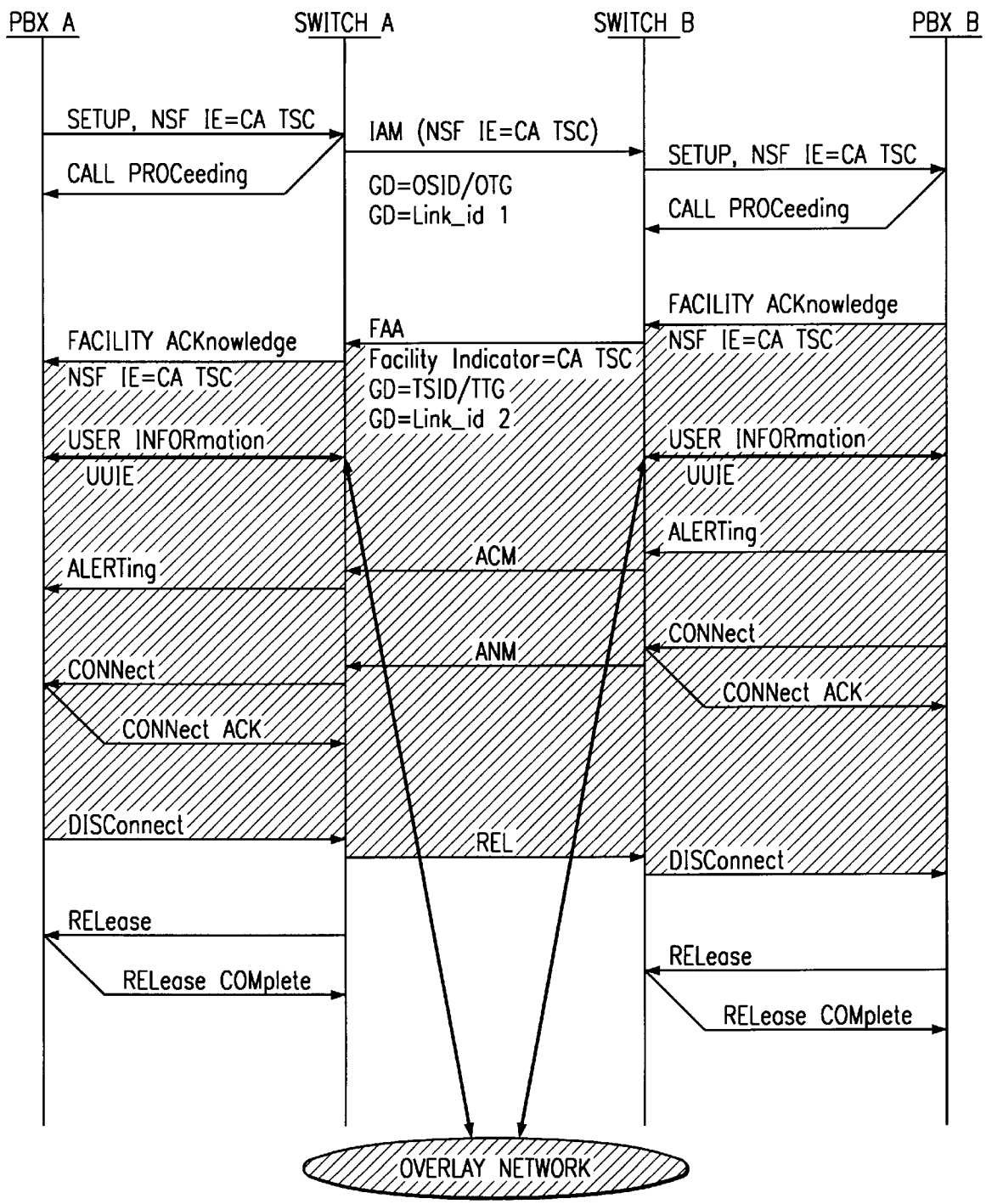
FIG. 9 is a call flow diagram illustrating messaging that occurs during the process of handling a call-associated temporary signaling connection at setup time according to one embodiment of the invention.

FIG. 8 is an operational flow diagram illustrating a process by which call associated temporary signaling connections are handled when the temporary signaling connection request is made at setup time. FIG. 9 is a call flow diagram illustrating messaging that occurs during the process of handling a call associated temporary signaling connection at setup time. Referring to FIGS. 8 and 9, this process is now described. Note that because this is a temporary signaling connection request at call setup, the temporary signaling connection request is made by the calling party.

In a step 804, a SETUP message is sent by the originating party to the network 112. Specifically, in one embodiment, SETUP message is sent by the originating party to the originating inter-exchange carrier switch 104. This SETUP message includes the call associated temporary signaling connection request. In one embodiment, the request sets an NSF-IE (network-specific facilities information element) to indicate that a call-associated temporary signaling connection is being requested at call setup.

This results in an initial address message (IAM) being sent from originating inter-exchange carrier switch 104 to terminating inter-exchange carrier switch 108 in a step 808. In one embodiment, the request is transmitted by including an OSID/OTG (originating switch ID/originating trunk group) and Link__id as generic digits (GDs) parameters in the IAM message.

If resources are not available within overlay network 304, overlay network 304 rejects the call associated temporary signaling connection request. This is accomplished by sending a FACILITY REJECT message (not illustrated in FIG. 9) to the originating party. This is illustrated by decision step 812 and process step 816. This FACILITY REJECT message can include an indication of a cause of the rejection (e.g., a cause information element). Additionally, network 112 may respond with a message indicating that the call is proceeding. This is accomplished by sending a CALL PROCEEDING message to the originating user.

If resources to handle the temporary signaling connection request are not available at terminating inter-exchange carrier switch 108, overlay network 304 sends a message to the terminating user indicating such. In one embodiment, this message is a SETUP message that includes an indication that temporary signaling connection resources are not available. In one embodiment, this is accomplished by inserting a code point in the binary facility coding value field of the NSF information element.

Additionally, in one embodiment, a similar notification is sent to the originating user. This is accomplished by sending a FACILITY REJECT message is sent to originating user. This is illustrated by decision step 820 and process step 824.

If resources are available, in a step 828 the call associated temporary signaling connection is delivered to the terminating user in a SETUP message. This is illustrated in FIG. 9 by the SETUP message being sent from terminating inter-exchange carrier switch 108 to the terminating party.

Upon receipt of their respective SETUP messages, originating inter-exchange carrier switch 104 and terminating user customer premise equipment 122B reply using a CALL PROCEEDING message.

In one embodiment, terminating customer premise equipment 122 sends an indication if it can support USER INFORMATION messages during call setup. In one embodiment, this is accomplished using a FACILITY ACKNOWLEDGE MESSAGE. FACILITY ACKNOWLEDGE message is sent to terminating inter-exchange carrier switch 108 and is ultimately forwarded to originating customer premise equipment 122A via originating inter-exchange carrier switch 104. In one embodiment, this is accomplished by a FACILITY ACCEPTED (FAA) message being sent from terminating switch 108 to originating switch 104. In one embodiment, FAA is an ISUP message and is made via network 112.

The FACILITY ACCEPTED message includes call associated temporary signaling connection coding in the network space facilities information element. In one embodiment, this is accomplished by including an TSID/TTG (terminating switch ID/terminating trunk group) and Link_id as generic digits (GDs) parameters in the IAM message.

Once the acknowledgment is received by the requesting party, the transfer of user-user data can take place. In one embodiment, this is accomplished by the sending party encapsulating ISDN user messages with a header that includes the following information: (1) a SWID/TG (switch ID/trunk group) of the receiving party; (2) the Link_id received in the IAM; (3) a NCID (network call identifier) if needed; and (4) addressing information of the switch serving the received party (for example, a TCP/IP address).

4.2.2 Call Associated Temporary signaling connection Requested After Call Setup

Figure 10:
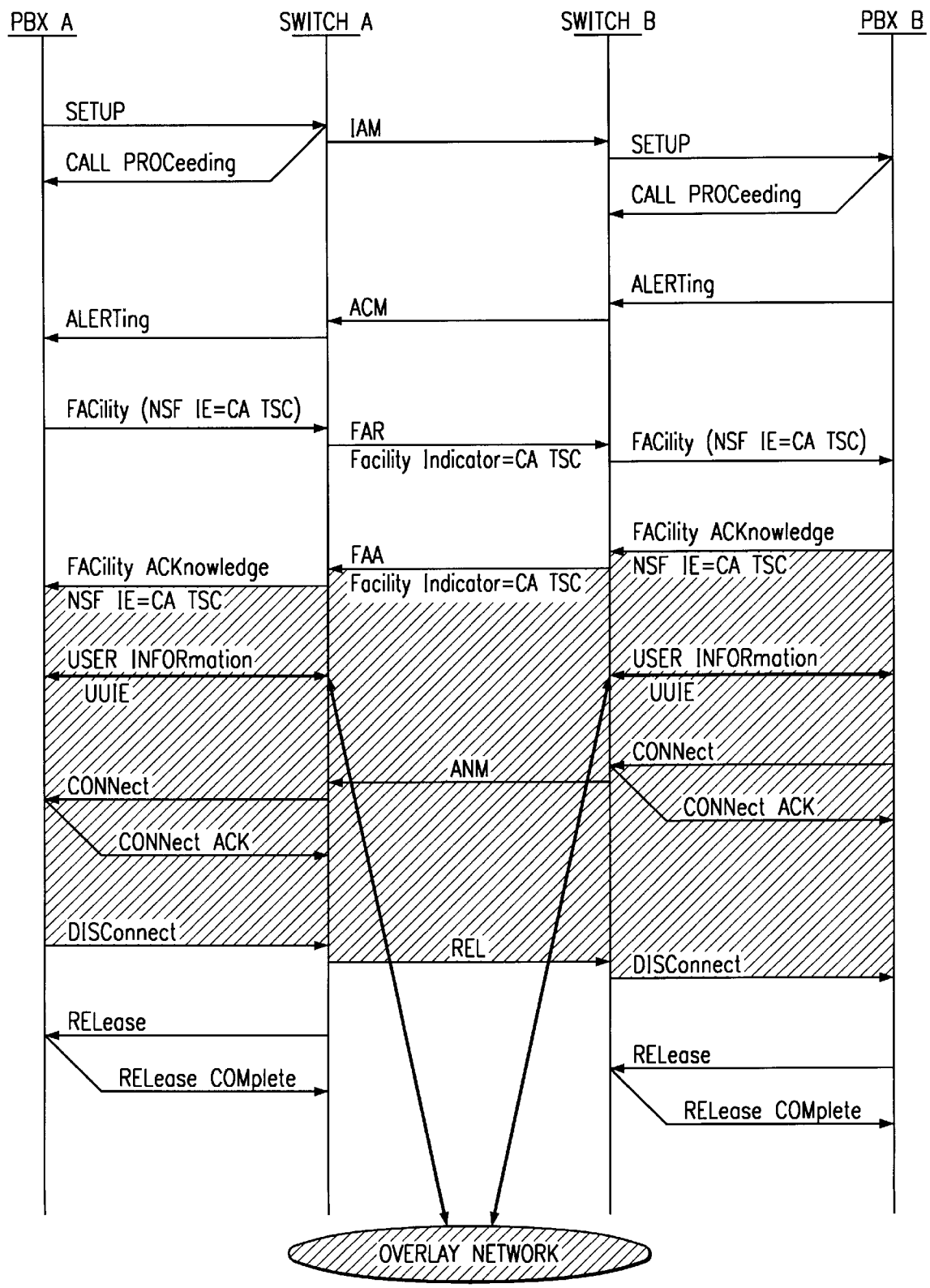
FIG. 10 is a call flow diagram illustrating messaging that occurs during the process of handling a call associated temporary signaling connection after setup time according to one embodiment of the invention.

In this scenario, either user can request a call associated temporary signaling connection after the initial SETUP message. FIG. 10 is a call flow diagram illustrating messaging that occurs during the process of handling a call associated temporary signaling connection after setup time. According to this embodiment, either the originating party or the terminating party can request a call associated temporary signaling connection after setup. The originating party can request a call associated temporary signaling connection anytime after receiving an ALERT message from originating inter-exchange carrier switch 104. The terminating party can request a temporary signaling connection anytime after sending the CALL PROCEEDING message that confirms channel identity.

Because the call is already set up, the request is not included in the original SETUP message. Instead, a separate FACILITY REQUEST message is sent by the requesting party (originating or terminating) to the requested party. In one embodiment, the FACILITY REQUEST message includes the request in the binary facility coding value field of the NSF information element. The request is transmitting from the requesters switch to the requestee's switch as described above. However, instead of being included in the IAM, it is included in the FACILITY REQUEST. The availability of resources is determined and the appropriate rejection or acknowledgment is made to the requester as described above with reference to steps 812 through 824.

4.2.3 FACILITY ACKNOWLEDGMENT Message

In one embodiment, an acknowledgment message must be received by the requesting party from the requested party before a USER INFORMATION message may be transferred. In this document, this acknowledgment is referred to as a FACILITY ACKNOWLEDGMENT message. The FACILITY ACKNOWLEDGMENT message in response to a call associated temporary signaling connection request can be sent anytime after the CALL PROCEEDING message has been sent.

In one embodiment, FACILITY ACKNOWLEDGMENT message includes call associated temporary signaling connection coding in the network-specific facilities information element.

Note that in one embodiment, if a call associated temporary signaling connection request is rejected by a switch somewhere in the call path, the subsequent SETUP messages continuing toward the terminating user will not include the call associated temporary signaling connection request. Also according to one embodiment, when a call associated temporary signaling connection request contained in a FACILITY message is rejected, the FACILITY message will not be tandem past the switch rejecting the request. In other words, the message will not be propagated any further to another switch or to customer premise equipment 122B by the switch rejecting the request.

In one embodiment, the FACILITY REJECT message includes an network-specific facilities information element indicating the rejection, and a cause identification element indicating the cause of the rejection. Examples of causes can include call rejected, facility rejected, switching equipment congestion, requested facility not subscribed, requested facility not implemented.

In one embodiment call associated temporary signaling connection acknowledgments can be in response to a SETUP message or a FACILITY message. In either case, a positive acknowledgment of the request message is a FACILITY ACKNOWLEDGE message which causes processing of the call associated temporary signaling connection request to proceed. Negative acknowledgments include a FACILITY REJECT message, a DISCONNECT message, a RELEASE COMPLETE message. A negative acknowledgment by way of a FACILITY REJECT message causes rejection of the call associated temporary signaling connection but allows processing of a B-channel request (a request to set up a voice path) to continue normally.

A negative acknowledgment via either the DISCONNECT message or the RELEASE COMPLETE message results in rejection of the call associated temporary signaling connection request and clearing of the B-channel connection.

4.2.4 Transfer of User Information Messages

As described above, user information messages may be sent by either user provided a temporary signaling connection has been successfully established. In one embodiment, user information messages are transported by overlay network 304 intact without overlay network 304 needing to interpret the contents. In this embodiment, any syntax errors contained within the message must be resolved by the end users.

In one embodiment, user information messages are bounded to a maximum length. If a user information message exceeds the maximum allowable length, the message will not be transmitted across the network and a status message is sent to the sending user indicating the same.

Note that in one embodiment, sending a user information message does not change the state of the call.

In one embodiment, overlay network 304 flow controls the transfer of user information messages when needed. In one embodiment, this is accomplished by means of a congestion control message which contains a congestion level information element indicating the level of congestion on overlay network 304. In one embodiment, two indications of congestion level are specified.

A level of congestion indication that the receiver is not ready indicates that the user should suspend sending user information messages across overlay network 304. A congestion level information element indicating that the receiver is ready notifies the sender that the transmission of user information messages may resume. After having sent an indication that the receiver is not ready, overlay network 304 may discard any user information messages that are subsequently received.

The user can also send CONGESTION CONTROL messages to shut off the flow of user information messages from the network. In this event, the network immediately informs the foreign user by sending a CONGESTION CONTROL message. Any user information received from the remote user will be discarded by overlay network 304.

Either the user or the network 304 can resume flow by sending a CONGESTION CONTROL message indicating that the receiver is ready. In one embodiment, this can be done by the entity that originally sent the CONGESTION CONTROL message which initiated flow control.

It should be noted that temporary signaling connections may encounter congestion from either overlay network 304 or from one of the involved users. Overlay network 304 provides flow control to ensure that no single user is allowed to monopolize the network resources and have an adverse effect on service provided to other users. Therefore, an ideal congestion control strategy addresses both network congestion and user congestion concerns.

When a user indicates to overlay network 304 that the user is congested (by sending a congestion control receiver not ready message), in one embodiment overlay network 304 immediately forwards this congestion indication to the other temporary signaling connection user. On the other hand, if a network element is congested, neither user is notified of this congestion until an attempt is made to transfer user-to-user information across overlay network 304. When this occurs, the user initiating the transfer is notified of the congestion.

When the network congestion clears, the network may send a CONGESTION CONTROL RECEIVER READY message informing the user that it may again use the temporary signaling connection. As described above, in the event of congestion, the user information message may be discarded.

In one embodiment, overlay network 304 assumes no responsibility for recovery of loss messages. In this embodiment, it is the responsibility of the end users to recover the loss of user information messages as a result of congestion. In alternative embodiments, overlay network 304 is provided the capability to recover loss messages or messages otherwise not transferred due to congestion.

Normal call clearing procedures can be used to simultaneously disconnect the call associated temporary signaling connection and the associated d-channel connection. A DISCONNECTED message initiates the normal call clearing procedures.

In an error recovery situation a user may invoke RELEASE and RELEASE COMPLETE messages which also clearly call associated temporary signal connection. A cause information element associated with DISCONNECT, RELEASE and RELEASE COMPLETE messages is independent of the call associated temporary signal connection because these messages explicitly clear the d-channel connection. Only a FACILITY REJECT message contains a cause information element pertaining to the temporary signaling connection itself.

Overlay network 304 notifies customer premise equipment 122 at both ends of a connection for each call associated temporary signaling connection that is being cleared according to one embodiment. Overlay network 304 can initiate clearing procedures when the maximum limit on a number of messages is sent and received by a switch has been exceeded.

If a call associated temporary signaling connection is lost because of a d-channel backup switch over, overlay network 304 also notifies far end customer premise equipment 122. In either case, overlay network 304 sends a FACILITY message containing a network-specific facility information element indicating a clearing of the call associated temporary signaling connection.

Notification of a call associated temporary signaling connection clearing has no impact on the state of these associated circuit switch call remains active. The user can attempt to set up a new call associated temporary signaling connection at any time. It should be noted, however, that until the reason for the overlay network 304 shutdown has been corrected, attempts to set up a new call associated temporary signaling connection will be rejected.

4.3 Non-call associated temporary signaling connection

Figure 11:
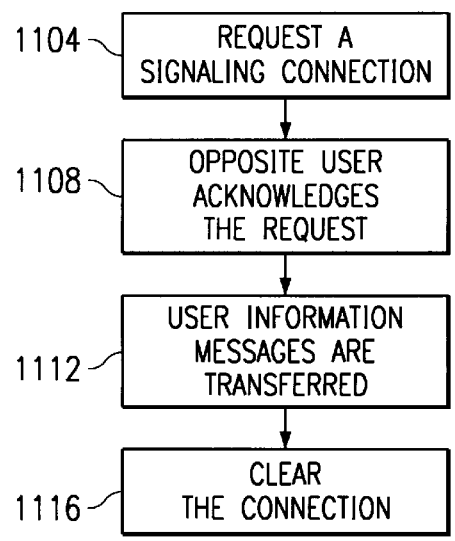
FIG. 11 is an operational flow diagram illustrating a non-call associated temporary signaling connection according to one embodiment of the invention

The non-call associated temporary signaling connection service allows users to communicate by means of user-to-user signaling without setting up a circuit-switched connection. A temporary signaling connection is established and cleared in a manner that is similar to the control of a circuit-switched connection. FIG. 11 is a flowchart illustrating a non-call associated temporary signaling connection according to one embodiment of the invention. In step 1104, the originating user requests a non-call associated temporary signaling connection. The originating user sends a SET UP message identifying that a temporary signaling connection is to be established. In one embodiment, the SET UP message is encoded to indicate a bearer capability information element, a channel identification information element, and a network-specific facilities information element.

For a non-call associated temporary signaling connection, the bearer capability information element can include unrestricted digital information in the information transfer capability field, a packet mode indication in the transfer mode field, and an indication of the user information layer two and three protocols. Channel identification information element denotes exclusive use of the d-channel and network-specific facilities information element indicates that binary facility coding is non-call associated temporary signaling connection.

In a step 1108, the opposite (i.e., non-requesting) user acknowledges the non-call associated temporary signaling connection request. In one embodiment, this acknowledgment must be received from the opposite user before user information messages maybe transmitted in either direction. A terminating user may also send a negative acknowledgment indicating a release or a release complete.

The terminating user and overlay network 304 may positively acknowledge the non-call associated temporary signaling connection request with a connect message. In one embodiment, user-to-user information is not included in a connect message that is used to acknowledge a non-call associated temporary signaling connection request.

Overlay network 304 may reject a non-call associated temporary signaling connection request when the temporary signaling connection resources are busy. This can be accomplished by sending a release or release complete message indicating the cause of the rejection. Note that these messages may be preceded by a call proceeding message.

Terminating user rejects a non-call associated temporary signaling connection request by responding to the set up message with a release complete message indicating that the facility is rejected.

If overlay network 304 receive a call proceeding message, progress message, or an alerting message from the terminating user before the connect or the release complete message, overlay network 304 ignores these messages locally. If a facility message is received from the terminating user before a connect or a release complete message, overlay network 304 responds with a facility reject message indicating that these messages are rejected.

In a step 1112, user information messages are transferred between the originating and terminating users. In one embodiment, this is accomplished as described above for the call associated temporary signaling connection transfer of user information messages. User information messages may be sent by either user once the temporary signaling connection has been successfully established. Overlay network 304 transports the user information messages intact without interpreting the contents.

In step 1112, in one embodiment overlay network 304 flow controls user information messages when necessary. In one embodiment, flow control for the non-call associated temporary signaling connection is accomplished as described above with reference to the call associated temporary signaling connection. Flow control messages can be originated by overlay network 304 or by either user.

In a step 1116, to complete the transfer messages, the non-call associated temporary signaling connection is cleared. Clearing of the non-call associated temporary signaling connection can be initiated by either party using a release message. To complete the clearing, the other entity responds with a release complete message. Because, there is not a call associated with this connection, a b-channel is in use and therefore a disconnect message is not required to disconnect the b-channel.

5. Transport of User-to-User Data

As described above, user-to-user data is transported via an independent overlay network 304 contemporaneously with a network communication between the parties. Although numerous configurations for overlay network 304 are possible, two particular configurations are desired: (1) transporting user-to-user data over SS7 signaling links (i.e., implementing overlay network 304 using SS7 signaling); and (2) transporting user-to-user data as voiceband over IMTs (inter-machine trunks).

The first scenario, transporting user-to-user data over SS7 signaling links, allows message associated user-to-user information to be invoked in conjunction with the temporary signaling channels. In one embodiment of this scenario, user information is mapped into ISUP USR messages which traverse the SS7 network. Preferably, in this embodiment, the amount of user-to-user information that can be transferred is limited and messages are subject to extensive flow control.

In one embodiment, for non-call associated temporary signaling connections, a voice path is established in network 112 between originating switch 104 and terminating switch 108. It is not necessary to establish a voice path at the user-network interface. When either user sends a user information message, a timer is started at each switch 104, 108. The timer is reset when another user information message is sent by either user. Upon expiration of the timer, both the temporary signaling connection and the temporary voice path are brought down.

The second scenario, transporting user-to-user data as voiceband over IMTs, establishes a transmission path (i.e., a voice path) of variable bandwidth in the network 110 between originating switch 104 and terminating switch 108. User information messages are mapped as voiceband data and traverse the established voice path. In other words, in this scenario, the IMT network 110 functions as overlay network 304. In one embodiment, a message queue is maintained at each switch 104, 108. Messages on the queue destined for the same terminating switch 108 are transferred over the voice path. Depending on the queue size, the switch may increase or decrease the bandwidth of the path.

As with the non-call associated scenario described above, timers are set to limit the amount of time the voice path remains active. Upon expiration of the timer, the voice path is brought down.

Note that because the same queue and voice path can be used for messages from different temporary signaling connections, data integrity issues may arise if user information messages arrive out of sequence with respect to call control messages.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. In a communications network over which a first user communicates with a second user via a signaling network that is independent of voice channel paths of the communications network, a system for allowing the first user to send user-to-user data to the second user, comprising:

means for determining whether a frame of data from the first user includes user-to-user data to be transferred to the second user;

means for formatting said user-to-user data for transfer; and means for sending said formatted user-to-user data to the second user via a path that is independent of both the signaling network and the voice channel paths of the communications network.

2. The system of claim 1, further comprising means for removing said user-to-user data from said frame of data from the first user.

3. The system of claim 2, wherein said frame of data includes a voice portion and a signaling portion and said means for removing comprises means for demultiplexing said signaling portion and said voice portion.

4. The system of claim 1, wherein said means for formatting said user-to-user data comprises means for packaging said user-to-user data into a block of user-to-user data.

5. The system of claim 1, wherein said means for determining comprises means for decoding a signaling portion of said frame of data.

6. The system of claim 1, further comprising means for determining a number of frames containing user-to-user data.

7. The system of claim 1, further comprising means for determining whether resources in said path are available for transferring said user-to-user data.

8. The system of claim 7, further comprising means for informing said first user if said resources in said path are not available for transferring said user-to-user data.

9. In a communications network over which a first user communicates with a second user via a signaling network that is independent of voice channel paths of the communications network, a method of transferring user-to-user data from the first user to the second user, the method comprising the steps of:

determining whether a frame of data from the first user includes user-to-user data to be transferred to the second user;

formatting said user-to-user data for transfer; and sending said formatted user-to-user data to the second user via a path that is independent of both the signaling network and the voice channel paths of the communications network.

10. The method of claim 9, further comprising a step of removing said user-to-user data from said frame of data from the first user.

11. The method of claim 10, wherein said frame of data includes a voice portion and a signaling portion and said step of removing comprises a step of demultiplexing said signaling portion and said voice portion.

12. The method of claim 9, wherein said step of formatting said user-to-user data comprises a step of packaging said user-to-user data into a block of user-to-user data.

13. The method of claim 9, wherein said step of determining whether a frame of data from the first user includes user-to-user data to be transferred to the second user comprises a step of decoding a signaling portion of said frame of data.

14. The method of claim 9, further comprising a step of determining a number of frames containing user-to-user data.

15. The method of claim 9, further comprising a step of determining whether resources in said path are available for transferring said user-to-user data.

16. The method of claim 15, further comprising a step of informing said first user if said resources in said path are not available for transferring said user-to-user data.

17. A communications network comprising:

a signaling network for supporting a communication of frames between a first user and a second user;

an overlay network connecting said first and second users and independent of said signaling network;

means for determining whether a frame of data from the first user includes user-to-user data to be transferred to the second user;

means for formatting said user-to-user data for transfer; and means for sending said formatted user-to-user data to the second user via a path of said overlay network.

18. The communications network of claim 17, further comprising means for removing said user-to-user data from said frame of data from the first user.

19. The communications network of claim 18, wherein said frame of data includes a voice portion and a signaling portion and said means for removing comprises means for demultiplexing said signaling portion and said voice portion.

20. The communications network of claim 17, wherein said means for formatting said user-to-user data comprises means for packaging said user-to-user data into a block of user-to-user data.

21. The communications network of claim 17, wherein said means for determining comprises means for decoding a signaling portion of said frame of data.

22. The communications network of claim 17, further comprising means for determining a number of frames containing user-to-user data.

23. The communications network of claim 17, further comprising means for determining whether resources in said path are available for transferring said user-to-user data.

24. The communications network of claim 23, further comprising means for informing said first user if said resources in said path are not available for transferring said user-to-user data.

* * * * *